Patented Aug. 17, 1926.

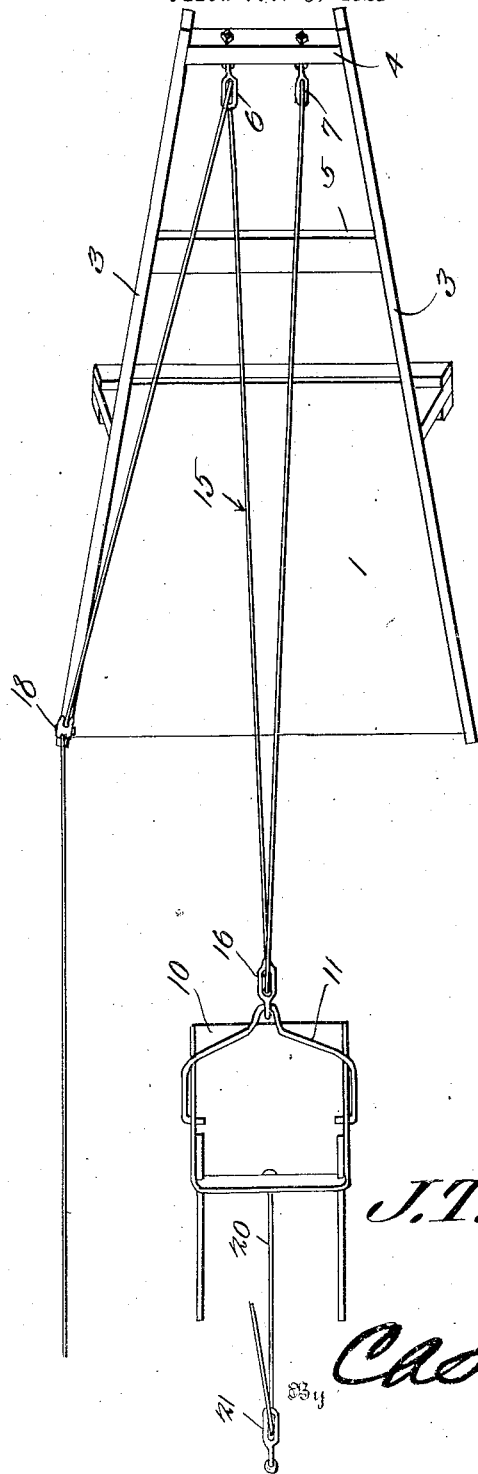

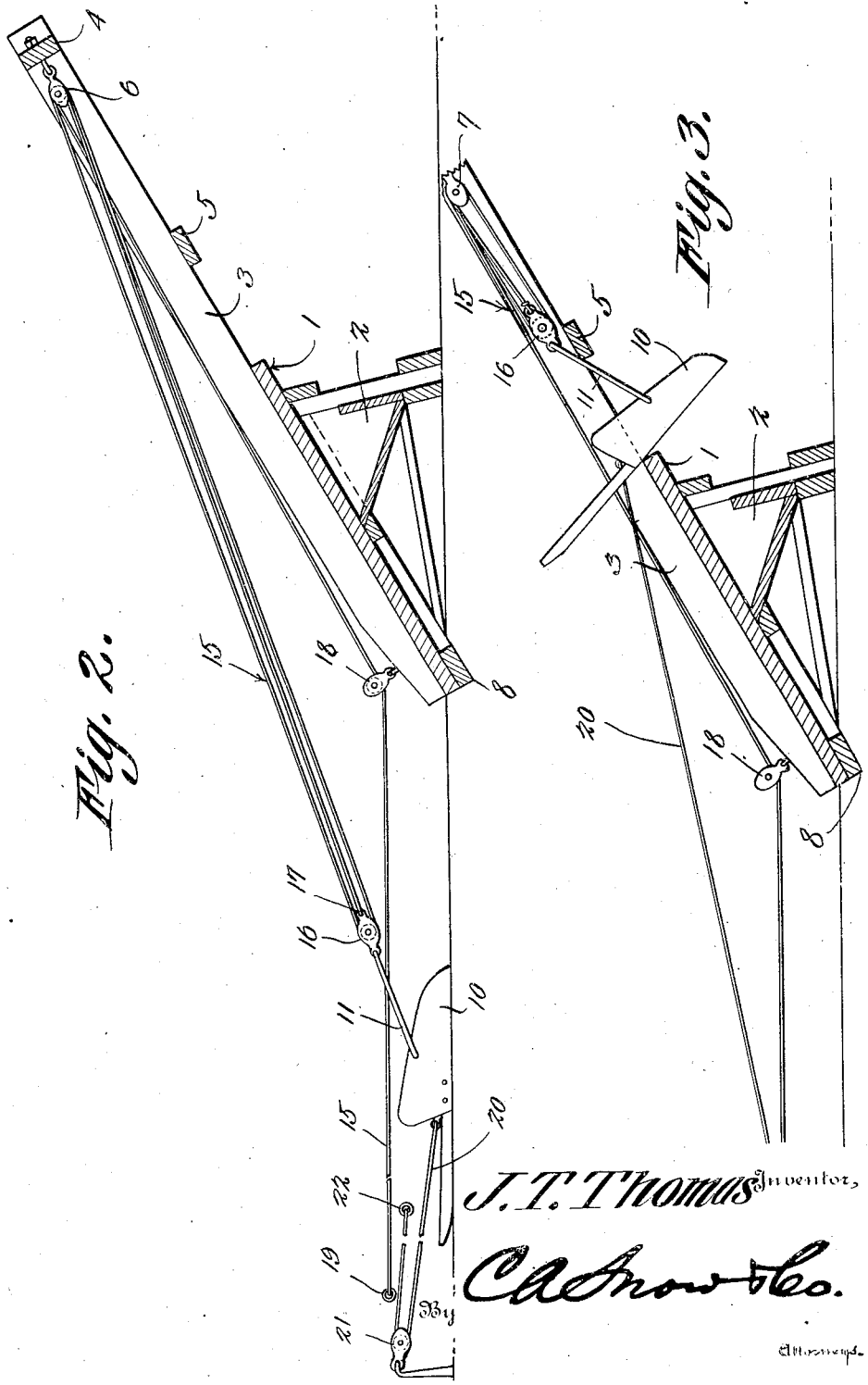

1,596,127

UNITED STATES PATENT OFFICE.

JAMES THEODORE THOMAS, OF BRADYVILLE, TENNESSEE.

EXCAVATING MACHINE.

Application filed October 3, 1923. Serial No. 666,374.

This invention relates to excavating machines and more particularly to machines for loading wagons from the side.

The object of the invention is to provide a machine of this character so constructed that a single round trip only of a team is necessary to move a scoop both ways for loading and dumping.

Another object is to so construct such a machine that it may be located wholly on one side of the wagon and operated from behind the machine leaving the entire front without obstructions so that the scoop may pass to and from the house or other point of excavation to the wagon without interference.

Another object is to provide a machine having an inclined floor up which the loading scoop is designed to travel and which is equipped with means for automatically dumping the scoop when it reaches a predetermined point.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 represents a plan view of the machine constituting this invention parts of the rope being broken out for convenience in illustration.

Fig. 2 is a longitudinal section thereof showing the scoop approaching the incline; and Fig. 3 is a similar view showing the scoop in dumping position.

In the embodiment illustrated the machine constituting this invention comprises an inclined platform 1 suitably supported and having a pocket 2 at its rear or lower face to receive ballast for holding it steady during use. The platform 1 is shown tapering toward its upper end and provided along its side edges with upstanding side flanges 3 which project beyond the rear end of the floor of the platform and are connected at their outer ends by a cross bar 4 and at a point between the cross bar 4 and the platform 1 by another cross bar 5 spaced from platform 1 a sufficient distance to permit a scoop 10 when drawn up over the platform to dump by gravity when it passes beyond platform 1 as shown in Fig. 3. This scoop has a bail 11 which engages the cross bar 5 and limits the dumping movement of the scoop.

A pair of pulleys 6 and 7 are supported by the cross bar 4 in spaced relation as shown clearly in Fig. 1 and which are designed for use in connection with the scoop hauling cable 15. This cable 15 is secured at one end to a pulley 16 mounted on the bail 11 of scoop 10 as shown at 17 and extends up around pulley 7 back around pulley 16 then up around pulley 6 back over a pulley 18 located at the lower end near one side of the platform 1. This cable 15 is provided at its free end with a hitching ring 19 which is designed to be connected with the swingletree to which a team of horses, not shown, is hitched. Another cable 20 is secured to the rear end of the scoop 10 and is designed to be passed around a pulley 21 which is intended to be anchored at a point remote and beyond the excavating point. The free end of cable 20 is provided with a hitching ring 22 to be connected with the swingletree above mentioned when the scoop 10 is to be drawn back into loading position.

The amount of pressure or power that is exerted on the scoop depends on the number of times the cable 15 is doubled, said cable being doubled any number of times according to the size of the scoop. If cable 15 is to be more than tripled pulley 16 may be a pulley or block with more than one wheel. Cable 15 may pass around the second wheel in block or pulley 16, then through a third pulley attached to cross bar 4 and so on until cable 16 is doubled enough times to provide sufficient power to operate any sized scoop desired.

In the use of this machine the inclined platform 1 is located adjacent the point of excavation and a furrow made in the ground to receive the wider front end 8 of the platform as is shown clearly in Figs. 2 and 3 to prevent tilting of the platform. The pocket 2 is then filled with suitable ballast such as gravel, rock or the like and is designed for steadying the platform when in use. If dirt is to be removed from under a house the free ends of the cables 15 and 20 are passed under the house to the side opposite that on which the platform is located. The pulley 21 is then anchored a convenient distance from the house and when a team is hitched to the ring 22 and driven toward the house the scoop 10 will be drawn backward under the house in position to be loaded such as shown in Fig. 2. The ring 22 is then released from the team and the team hitched to ring 19 of cable 15. The team is then driven back toward pulley 21 which will exert a pull on cable 15 and draw the scoop 10 up over the inclined platform 1 until the front end of the scoop enters the space between platform 1 and the cross bar 5 which will cause the scoop to tilt by gravity into the position shown in Fig. 3 and dump the contents thereof into the wagon (not shown) which is supposed to be located under the opening formed between the front end of the platform 1 and the cross bar 5.

It will thus be seen that the scoop will automatically dump when it reaches a predetermined point and after dumping the team is again hitched to the ring 22 of cable 20 and driven back toward the excavating point thus exerting a pull on cable 20 sufficient to draw the scoop back into loading position.

From the above description it will be seen that the team used for operating this machine will draw the scoop both ways while making a single round trip without traveling any additional distance. It will also be observed that the rope which pulls the loaded scoop forward is triple and obviously it may be of any suitable or desired size according to the load to be moved.

When the scoop is drawn backward and the cable 20 released from the team the scoop is free to swing to the right or left thereby enabling the operator to load to the best advantage. It is also to be observed that this machine is designed to be located wholly on one side of the wagon to be loaded and is operated from behind the machine thus leaving the entire front without obstructions.

Various changes in the form, shape, proportion and other minor details of construction may be made without departing from the principle or sacrificing any of the advantages of the claimed invention.

I claim:—

In an excavating machine, a loading platform including side rails converging towards their upper ends, supporting legs disposed under the platform and arranged at a point substantially intermediate the ends of the platform, a cross bar connecting the side rails at a point in spaced relation with the platform, a cross bar connecting the side rails at points adjacent to their outer ends, pulleys secured to the last mentioned cross arm, a scoop adapted to move over the platform and having a pulley, a pulley secured to the platform adjacent to the lower end of the platform, a flexible member connected with the pulley secured to the scoop, and passed over the pulley secured to the bar adjacent to one end of the bar, said flexible member adapted to pass over the pulley carried by the scoop, and over the other pulley carried by the cross bar, said flexible member adapted to pass over the last mentioned pulley, and said flexible member adapted to have connection with a suitable power device for moving the scoop over the platform, and said scoop adapted to fall between the upper end of the platform and first mentioned cross bar to cause the scoop to dump.

In testimony that I claim the foregoing as my own, I have hereto affixed my signature.

JAMES THEODORE THOMAS.